United States Patent [19]

Gerkema et al.

[11] Patent Number: 4,562,587
[45] Date of Patent: Dec. 31, 1985

[54] X-RAY TUBE HAVING A ROTARY ANODE

[75] Inventors: Jan Gerkema; Anton K. Niessen; Jozef B. Pelzer, all of Eindhoven, Netherlands

[73] Assignee: U.S. Philips Corporation, New York, N.Y.

[21] Appl. No.: 562,312

[22] Filed: Dec. 16, 1983

[30] Foreign Application Priority Data

Oct. 6, 1983 [NL] Netherlands .......................... 8303422

[51] Int. Cl.⁴ ............................................. H01J 35/28
[52] U.S. Cl. ...................................... 378/133; 378/125
[58] Field of Search ......................... 378/132, 133, 125

[56] References Cited

U.S. PATENT DOCUMENTS 4,210,371 7/1980 Gerkema .............................. 378/133

Primary Examiner—Craig E. Church
Attorney, Agent, or Firm—Robert J. Kraus

[57] ABSTRACT

An X-ray tube having a rotary anode which is accommodated in a vacuum-tight housing so as to be rotatable by means of at least one spirally grooved bearing. The mutually cooperating surfaces of the bearing consist essentially of Mo or of an alloy of Mo and W and are effectively wetted by a Ga-alloy serving as a bearing lubricant. In order to extend the life of the X-ray tube, 1 to 4% by weight of Ag and/or Cu are added to the Ga-alloy, as a result of which the formation of crystalline compounds is inhibited.

4 Claims, 2 Drawing Figures

X-RAY TUBE HAVING A ROTARY ANODE

BACKGROUND OF THE INVENTION

The invention relates to an X-ray tube having a rotary anode which is accommodated in a vacuum-tight housing so as to be rotatable by means of at least one metallubricated bearing.

An X-ray tube of this type is particularly suitable as a radiation source in medical diagnostic X-ray apparatuses.

U.S. Pat. No. 4,210,371 describes such an X-ray tube in which the bearing is a sliding bearing of which at least the mutually cooperating bearing surfaces consist of a metal or a metal alloy which is not substantially attacked by the lubricant present in the sliding bearing, which lubricant consists of Ga or a Ga-alloy which comprises at least 50% by weight of Ga and furthermore, not counting impurities, consists of In and/or Sn, which lubricant effectively wets the bearing surfaces and has a vapour pressure which is smaller than $10^{-4}$ Pa at 500° C. "Effective wetting" is to be understood to mean that there is a wetting contact in which a direct interaction exists between the metal atoms of the bearing surfaces and the atoms of the Ga or of the Ga-alloys. The bearing surfaces preferably consist of W or Mo or of an alloy of W and Mo because then no alloys with the lubricant are formed. Mo is preferably used because this is easier to machine than W.

Invenstigations have demonstrated that at the operating temperature of the X-ray tube, i.e. above 300° C., a closed polycrystalline layer or a Ga-alloy may be formed on the Mo bearing surfaces. An example of an intermetallic compound which can be formed on the interface is $MoGa_5$. As a result of this the bearing may gradually become occluded, which adversely influences the life of the X-ray tube.

SUMMARY OF THE INVENTION

It is an object of the invention to provide an X-ray tube having a rotary anode in which the formation of crystalline intermetallic compounds with the lubricant of the sliding bearing is suppressed or inhibited to thus extend the life of the X-ray tube.

This object is achieved by means of an X-ray tube having a rotary anode as described hereinbefore, which is characterized in that the lubricant comprises from 1 to 4% by weight of Ag and/or Cu.

The invention is based on the discovery that the formation of the intermetallic compounds on the interface is inhibited by the addition of Ag or Cu, which metals form alloys with the Ga from the lubricant.

A preferred embodiment of an X-ray tube according to the invention is characterized in that at least one of the mutually cooperating bearing surfaces of the sliding bearing comprises spiral grooves. During operation, lubricating liquid, i.e. Ga or Ga-alloys, is forced into the bearing by the spiral grooves. As a result of this a better distribution of the alloy in the bearing occurs and during rotation of the bearing it obtains a great dynamic stability in addition to an extra large loadability.

BRIEF DESCRIPTION OF THE DRAWING

The invention will now be described in greater detail with reference to the drawing, in which.

DESCRIPTION OF THE PREFERRED EMBODIMENT

Figure 1:
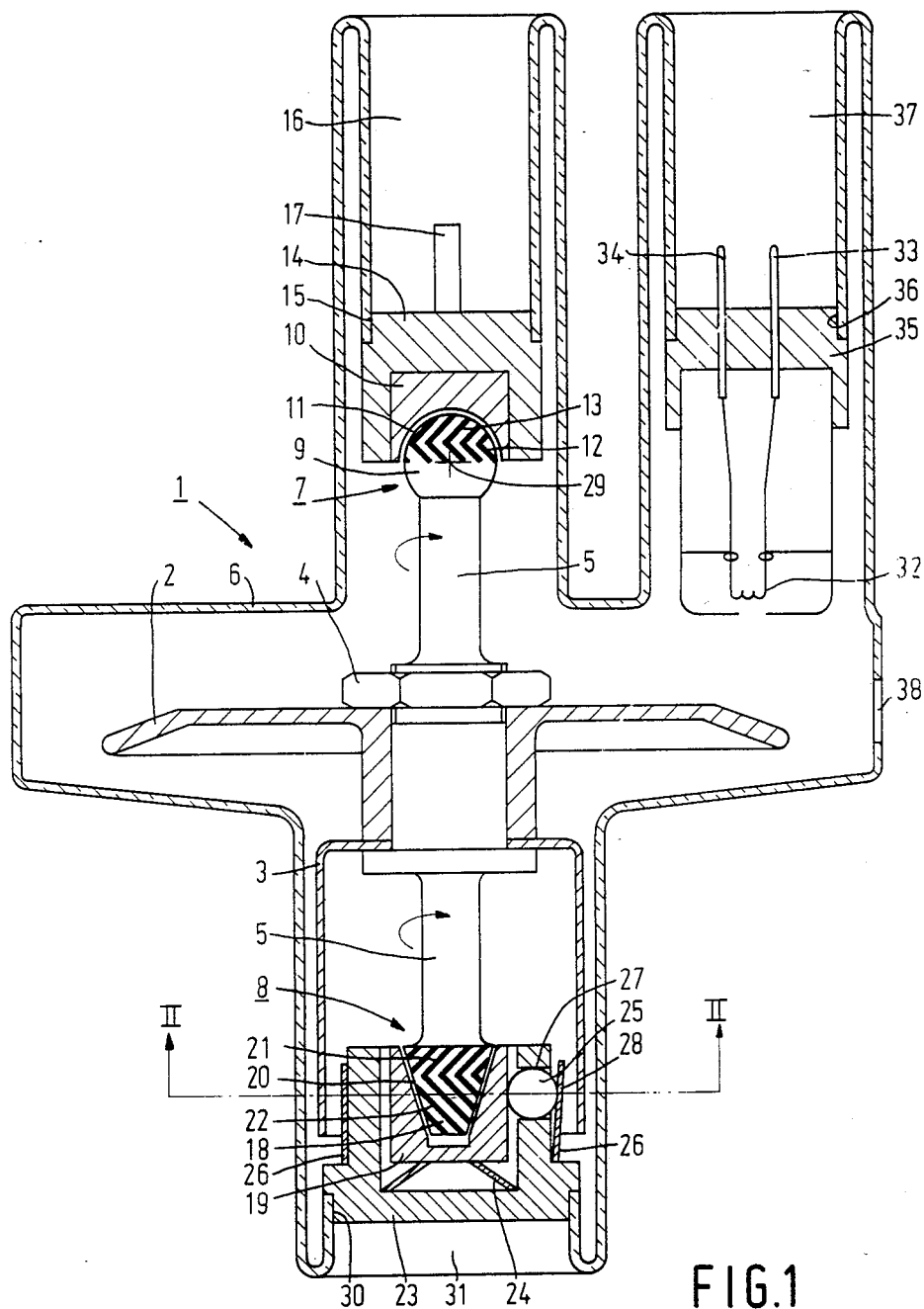
FIG. 1 is a diagrammatic longitudinal sectional view of a rotary anode X-ray tube according to the invention.

FIG. 1 shows an X-ray tube 1 having a rotary anode 2 which, together with a rotor 3, is mounted on a shaft 5 by means of a nut 4, the shaft being accommodated in a vacuum-tight housing 6 so as to be rotatable by means of two bearings 7 and 8.

The bearing 7 consists of a spherical part 9 which is rigidly connected to the shaft 5 and which is incorporated in a spherically recessed supporting member 10. Oppositely located surfaces of the spherical part 9 and the supporting member 10 constitute bearing surfaces of the bearing 7 and enclose a bearing gap 11. The bearing gap 11 is filled with a Ga-alloy which serves as a lubricant and which effectively wets the bearing surfaces of the bearing parts 9 and 10, which are manufactured from Mo. This wetting is so good that the surfaces under load in the tube are fully separated from each other. The spherical part 9 comprises a pattern of grooves 12 which upon rotation of the shaft 5 forces the lubricant towards that part of the spherical part 9 which is most remote from the bearing 8. The spherical part 9 furthermore comprises a second groove pattern 13 whose grooves extend oppositely to those of the groove pattern 12 and hence force lubricant in the opposite direction. As a result of the groove patterns 12, 13, the bearing 7 upon rotation of the shaft 5, has a great dynamic stability in addition to an extra large loadability radially and axially. The supporting member 10 is connected in a cylindrical structural member 14 which is connected in a cup-shaped recess 16 of the housing 6 by means of a vacuum-tight seal 15. Structural member 14 has a contact pin 17 for supplying the tube current and for dissipating a part of the thermal energy evolved by the anode during operation.

Figure 2:
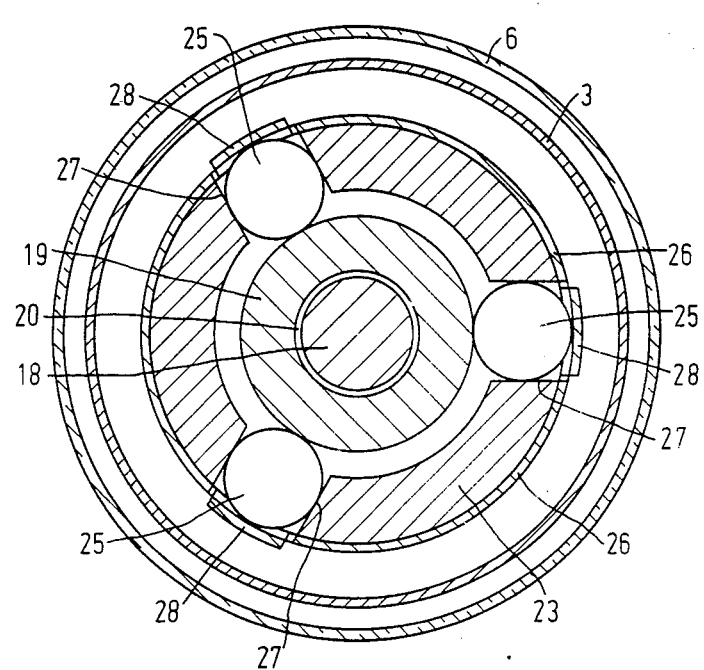
FIG. 2 is a cross-sectional view taken on the line II—II in FIG. 1.

The bearing 8 consists of a conical part 18 which is rigidly connected to the shaft 5 and which is incorporated in a conically recessed supporting member 19. The oppositely located surfaces of conical part 18 and supporting member 19 constitute the bearing surfaces of the bearing 8 an enclose a bearing gap 20. The bearing gap 20 is filled with a Ga-alloy which serves as a lubricant and which effectively wets the bearing surfaces of the bearing parts 18 and 19 which are manufactured from Mo. This wetting is so good that the surfaces under load in the tube are fully separated from each other. The conical part 18—similarly to the spherical part 9—comprises two groove patterns 21 and 22 which force the lubricant into the bearing gap 20 in opposite directions. As a result of this the bearing has a great dynamic stability in addition to an extra large loadability radially and axially. The supporting member is resiliently enclosed in a cylindrical structural member 23, namely axially by means of a cup spring 24 and radially by means of three steel balls 25 (see also FIG. 2) and a spring element 26. The balls 25 are enclosed in cylindrical apertures 27 in the structural member 23 and are forced radially against the supporting member 19 by means of resilient lugs 28 which are connected to the spring element 26. The axial resilience, by means of the cup spring 24, serves to take up variations in length of the shaft 5 as a result of varying temperatures in the tube. In the case of unbalance of the rotary anode 2, the radial resilience provided by the spring element 26 enables the shaft 5 to perform a precession movement over a conical surface, the apex of which lies in the mathematical centre 29 of the spherical part 9 of the bearing 7. This precession prevents excessive forces from being applied to the bearings. The structural member 23 is connected in a cup-shaped recess 31 of the housing 6 by means of a vacuum-tight seal 30.

A cathode 32, shown diagrammatically, is electrically connected to two contact pins 33 and 34 which are provided in a structural member 35 which is connected in a cup-shaped recess 37 of the housing 6 by means of a vacuum-tight seal 36. The cathode filament voltage is applied between the contact pins 33 and 34, while the tube current is dissipated via one of these pins. Generated X-ray radiation can leave the tube through the window 38.

Suitable Ga-alloys for filling the bearing gaps 11 and 20 are, for example, the two binary eutectic compositions 76 Ga—24 In and 92 Ga—8 Sn which melt at 16.5° C. and 20.0° C., respectively (compositions are given in % by weight). The ternary eutectic composition 62 Ga—25 In —13 Sn which melts at 5° C. is also suitable. According to the invention, 1 to 4% by weight of Ag and/or Cu are added to these compositions. A suitable addition is, for example, 1% by weight of Cu.

The application of the invention is not restricted to the embodiment as described hereinbefore, but is also usable in X-ray tubes of a different type, for example in X-ray tubes having a rotary anode which is journalled at one end.

What is claimed is:

1. An X-ray tube having a rotary anode which is accommodated in a vacuum-tight housing so as to be rotatable by means of at least one metal-lubricated bearing, in which the bearing is a sliding bearing of which at least the mutually cooperating bearing surfaces consist essentially of Mo or of an Mo-alloy which is not substantially attacked by the lubricant present in the sliding bearing, which lubricant consists essentially of Ga or a Ga-alloy which comprises at least 50% by weight of Ga and further comprises In and/or Sn, which lubricant effectively wets the bearing surfaces and has a vapour pressure which is smaller than $10^{-4}$ Pa at 500° C., characterized in that the lubricant comprises from 1 to 4% by weight of Ag and/or Cu.

2. An X-ray tube having a rotary anode as claimed in claim 1, characterized in that the mutually cooperating bearing surfaces consist essentially of Mo or of an alloy of Mo and W.

3. An X-eay tube having a rotary anode as claimed in claim 1 or 2, characterized in that at least one of the cooperating bearing surfaces of the sliding bearing has spiral grooves.

4. An X-ray tube having a rotary anode as claimed in claim 3, characterized in that, viewed in the direction of the axis of rotation of the bearing, the spiral grooves are provided in two groups which during operation both force the lubricant into the bearing.

* * * * *